UNITED STATES PATENT OFFICE.

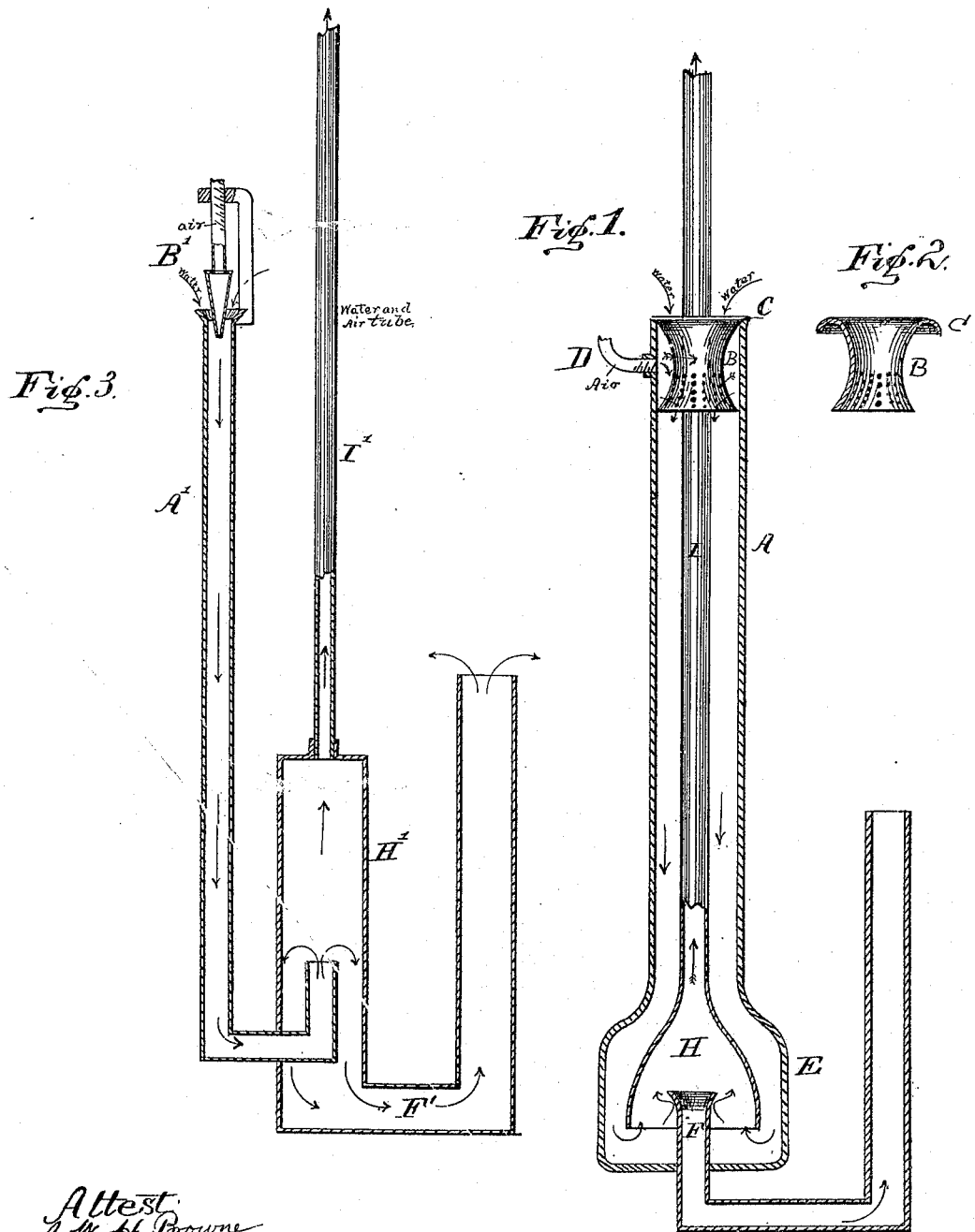

THOMAS ARTHUR, OF BANGOR, PENNSYLVANIA, ASSIGNOR OF ONE-HALF TO ROBERT J. NAGLE, OF SAME PLACE.

HYDROPNEUMATIC-PRESSURE APPARATUS.

SPECIFICATION forming part of Letters Patent No. 383,429, dated May 29, 1888.

Application filed March 26, 1887. Serial No. 232,590. (No model.)

*To all whom it may concern:*

Be it known that I, THOMAS ARTHUR, residing at Bangor, in the county of Northampton and State of Pennsylvania, have invented certain new and useful Improvements in Hydropneumatic-Pressure Apparatus, of which the following is a specification, reference being had therein to the accompanying drawings.

This invention relates to apparatus in which the descent of a column of water is caused to draw a current of air into the pipes, and a portion of the mingled air and water is raised to a height above the original level of the water in the inflow-pipe.

The construction and operation of the apparatus will be pointed out hereinafter.

Figure 1 is a vertical central section of an apparatus embodying the principles of my invention. Fig. 2 is a detail of the attachment used as an inspirator. Fig. 3 is a modified construction of the device, shown in section, as in Fig. 1.

A indicates the inflow-pipe, which is supposed to receive a constant supply of water from any suitable source.

In the upper end of pipe A there is placed a double conical or hour-glass-shaped vessel, B, which is open at both ends, and has a projecting flange, C, to prevent it from dropping entirely into the pipe A. The lower end of vessel B is perforated, and the vessel acts as an inspirator or injector. A branch pipe, opening, or air-inlet, D, permits the entrance of air into the space around the central portion of vessel B when the same is seated in the end of tube A, as shown in Fig. 1.

At the lower end of tube A there is an expansion-chamber, E, and an outlet-pipe, F, rises a little way inside this chamber. This pipe F turns upward and has its escape somewhat above the bottom level of chamber E, when the apparatus is used for raising water. The inner end is bell-mouthed. An expansion-chamber, H, is inclosed within the chamber E, and has its upper end below and surrounding the inner end of escape-pipe F. The chamber H has a pipe, I, projecting therefrom and rising to any desired height, preferably considerably above the upper end of inlet-pipe A.

When water is caused to flow into pipe A, it will pass rapidly down through vessel or funnel B, and as there is a volume of air surrounding the upper part of vessel B, the air will be drawn in through the holes and caused to mingle with the water and flow down pipe A. Arriving at the chamber E, the water and air will rise inside the chamber H until the surface of the main body of water is above the mouth of outlet F. The water will then begin to flow out through pipe F; but as the outer end of this pipe is higher than the inner end, there will be something of a back-pressure. The upper portion of chamber H will be full of commingled air and water—the air in state of compression. This will drive a certain proportion of the water before it up the pipe I, and a small quantity of water and nearly all the injected air can be carried in this way to a considerable height and there delivered.

It is necessary that the outer end of pipe F be higher than its inner end to have water forced up pipe I; otherwise, only compressed air will be forced up pipe I, and all the water will escape by pipe F, assuming said pipe to be of sufficient capacity.

The vessel B is easily removable and replaceable. It is made, by preference, from thin metal.

In the modification, Fig. 3, A' represents the inflow-pipe, and B' the air injector or inspirator, which is adjustable relatively to the mouth of pipe A'. Pipe A' enters chamber H', and has its escape-opening somewhat above the bottom of said chamber. Chamber H' has a delivery-pipe, I', of less diameter than itself and extending upward as far as is desirable for the delivery of water and compressed air. Escape-pipe F' connects with chamber H' and has its outflow end somewhat higher than the top of chamber H'. The operation of this modification is like that of the apparatus in Fig. 1. Water entering pipe A' takes air along with it from inspirator B'. The mixed air and water rise in chamber H', and while much of the water escapes by pipe F', a considerable quantity, mingled with compressed air, will be forced up pipe I' to a height much above the level of the inflow end of A'.

I claim—

1. The inflow-pipe having an open mouth at the extreme upper end to permit a direct downflow of water, combined with an inspirator or air-injector near the open end of said pipe, an expansion-chamber connected with the lower end of said inflow-pipe, an escape-pipe leading from the expansion-chamber and having its outflow end above said expansion-chamber, and a delivery-pipe leading from the upper portion of said expansion-chamber.

2. The open-ended inflow-pipe having a double conical inspirator removably attached to its upper end, as described, in combination with the expansion-chamber, escape-pipe, and delivery-pipe, all constructed and relatively arranged substantially as shown and described.

3. The inflow-pipe having an open mouth at the extreme upper end, said pipe having an expanded lower portion, in combination with an expansion-chamber inclosed therein and having a delivery-pipe connected therewith, and an escape-pipe having its inner end above the bottom of the expansion-chamber and its outer end above the upper portion of said expansion-chamber.

4. The combination, with an inflow-pipe having an air-injector near its mouth, of an expansion-chamber connected with the lower end of said inflow-pipe, an escape-pipe, and a delivery-pipe extending upward from the upper portion of the expansion-chamber, substantially as described.

In testimony whereof I affix my signature in presence of two witnesses.

THOMAS ARTHUR.

Witnesses:
W. A. BARTLETT,
PHILIP MAURO.